(12) United States Patent
Lee et al.

(10) Patent No.: US 9,941,508 B2
(45) Date of Patent: Apr. 10, 2018

(54) CATHODE ACTIVE MATERIAL FOR SECONDARY BATTERY, METHOD OF MANUFACTURING THE SAME, AND CATHODE FOR LITHIUM SECONDARY BATTERY INCLUDING THE CATHODE ACTIVE MATERIAL

(71) Applicant: LG Chem, Ltd., Seoul (KR)

(72) Inventors: Dong Kwon Lee, Daejeon (KR); Seung Beom Cho, Daejeon (KR); Jun Seok Nho, Daejeon (KR); Wook Jang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/623,929

(22) Filed: Jun. 15, 2017

(65) Prior Publication Data

US 2017/0288206 A1  Oct. 5, 2017

Related U.S. Application Data

(62) Division of application No. 14/420,428, filed as application No. PCT/KR2014/009195 on Sep. 30, 2014, now abandoned.

(30) Foreign Application Priority Data

Sep. 30, 2013 (KR) .................. 10-2013-0117036
Sep. 29, 2014 (KR) .................. 10-2014-0130374

(51) Int. Cl.
*H01M 4/04* (2006.01)
*H01M 4/131* (2010.01)
(Continued)

(52) U.S. Cl.
CPC ....... *H01M 4/0416* (2013.01); *H01M 4/0471* (2013.01); *H01M 4/131* (2013.01);
(Continued)

(58) Field of Classification Search
CPC ................................. H01M 4/0416
See application file for complete search history.

(56) References Cited

U.S. PATENT DOCUMENTS 6,110,442 A    8/2000 Xia et al.
2004/0258986 A1    12/2004 Shen et al.
(Continued)

FOREIGN PATENT DOCUMENTS

CN    1627550 A    6/2005
CN    101308925 A    11/2008
(Continued)

OTHER PUBLICATIONS

Translation of KR101249055 (Year: 2012).*
(Continued)

*Primary Examiner* — Sarah A. Slifka
*Assistant Examiner* — Brian R Ohara
(74) *Attorney, Agent, or Firm* — Lerner, David, Littenberg, Krumholz & Mentlik, LLP (57) ABSTRACT

The present invention relates to a cathode active material including a lithium-containing transition metal oxide and two or more metal composite oxide layers selected from the group consisting of Chemical Formulae 1 to 3 which are coated on the surface of the lithium-containing transition metal oxide, a method of manufacturing the same, and a cathode for a secondary battery including the cathode active material, $M(C_2H_5O_2)_n$    [Chemical Formula 1]

$M(C_6H_{(8-n)}O_7)$    [Chemical Formula 2]

$M(C_6H_{(8-n)}O_7)(C_2H_5O_2)$    [Chemical Formula 3]

(where M, as a metal desorbed from a metal precursor, represents at least one metal selected from the group
(Continued)

consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce, and n is an integer between 1 and 4).

7 Claims, 3 Drawing Sheets

(51) Int. Cl.
    *H01M 4/1391* (2010.01)
    *H01M 4/36* (2006.01)
    *H01M 4/62* (2006.01)

(52) U.S. Cl.
    CPC ......... *H01M 4/1391* (2013.01); *H01M 4/366* (2013.01); *H01M 4/62* (2013.01)

(56) References Cited

U.S. PATENT DOCUMENTS

| | | |
|---|---|---|
| 2005/0175899 A1 | 8/2005 | Noda et al. |
| 2007/0122338 A1 | 5/2007 | Park et al. |
| 2008/0113269 A1 | 5/2008 | Yamamoto et al. |
| 2009/0004563 A1 | 1/2009 | Zhong |
| 2009/0253042 A1 | 10/2009 | Sun et al. |
| 2010/0233541 A1 | 9/2010 | Sano |
| 2011/0108760 A1 | 5/2011 | Mukainakano et al. |
| 2011/0226985 A1 | 9/2011 | Park et al. |
| 2011/0274973 A1 | 11/2011 | Sheem et al. |
| 2012/0326078 A1 | 12/2012 | Chung et al. |
| 2013/0149227 A1 | 6/2013 | Chon et al. |
| 2013/0149616 A1 | 6/2013 | Lee et al. |
| 2013/0224570 A1 | 8/2013 | Sasaki et al. |
| 2013/0236788 A1 | 9/2013 | Tsunozaki et al. |
| 2014/0272583 A1 | 9/2014 | Hellring et al. |
| 2014/0308576 A1 | 10/2014 | Gaben et al. |
| 2014/0339085 A1 | 11/2014 | Bouyer et al. |
| 2015/0104713 A1 | 4/2015 | Gaben et al. |

FOREIGN PATENT DOCUMENTS

| | | |
|---|---|---|
| CN | 101510606 A | 8/2009 |
| CN | 101515644 A | 8/2009 |
| CN | 102185141 A | 9/2011 |
| CN | 102195034 A | 9/2011 |
| CN | 102237523 A | 11/2011 |
| CN | 102931384 A | 2/2013 |
| CN | 103107337 A | 5/2013 |
| EP | 2096692 A1 | 9/2009 |
| JP | 2003500318 A | 1/2003 |
| JP | 2007039266 A | 2/2007 |
| JP | 2007242318 A | 9/2007 |
| JP | 2010218838 A | 9/2010 |
| JP | 2013093167 A | 5/2013 |
| JP | 2013107815 A | 6/2013 |
| JP | 2013191516 A | 9/2013 |
| JP | 2013539167 A | 10/2013 |
| KR | 19990073753 A | 10/1999 |
| KR | 100366058 A | 4/2001 |
| KR | 20010029695 A | 4/2001 |
| KR | 100813014 B1 | 3/2008 |
| KR | 20080099131 A | 11/2008 |
| KR | 20090093165 A | 9/2009 |
| KR | 20110017253 A | 2/2011 |
| KR | 101249055 * | 3/2012 |
| KR | 20120021674 A | 3/2012 |
| KR | 101249055 61 | 3/2013 |
| TW | 567632 B | 12/2003 |
| WO | 2009105773 A2 | 8/2007 |
| WO | 2012057289 A1 | 5/2012 |
| WO | 2013064773 A1 | 5/2013 |
| WO | 2013064776 A1 | 5/2013 |
| WO | 2013064779 A1 | 5/2013 |
| WO | 2013064781 A1 | 5/2013 |

OTHER PUBLICATIONS

Wang, Xiong, et al., Citric acid-assisted sol-gel synthesis of nanocrystalline LiMn2O4 spinel as cathode material, Journal of Crystal Growth, Aug. 2003, pp. 123-127, vol. 256, Issues 1-2.
International Search Report for Application No. PCT/KR2014/009195 dated Jan. 14, 2015.
International Search Report for Application No. PCT/KR2014/009192 dated Jan. 15, 2015.
Extended Search Report from European Application No. 14827995, dated Oct. 1, 2015.
Liu, et al., "Synthesis and Electrochemical Studies of Spinel Phase LiMn2O4, Cathode Materials Prepared by the Pechini Process." Journal of the Electrochemical Society, vol. 143, No. 3, Mar. 1, 1996, pp. 879-884, XP002032962.
Extended Search Report from European Application No. 14827702.3, dated Oct. 1, 2015.
Office Action from Chinese Application No. 201480002134.5, dated Jun. 2, 2016.
International Search Report for Application No. PCT/KR2014/009194 dated Jan. 15, 2015.
Extended Search Report from European Application No. 14825240.5, dated Sep. 24, 2015.
Office Action from Chinese Application No. 201480002138.3, dated Jun. 24, 2016.
Chinese Search Report from Application No. 201480021345, dated Aug. 30, 2017.

\* cited by examiner

CATHODE ACTIVE MATERIAL FOR SECONDARY BATTERY, METHOD OF MANUFACTURING THE SAME, AND CATHODE FOR LITHIUM SECONDARY BATTERY INCLUDING THE CATHODE ACTIVE MATERIAL

CROSS-REFERENCE TO RELATED APPLICATION

The present application is a divisional of U.S. patent application Ser. No. 14/420,428, filed Feb. 9, 2015, which is a national phase entry under 35 U.S.C. § 371 of International Application No. PCT/KR2014/009195, filed Sep. 30, 2014, which claims priority to Korean Patent Application No. 10-2013-0117036, filed Sep. 30, 2013 and Korean Patent Application No. 10-2014-0130374, filed Sep. 29, 2014, the disclosures of which are incorporated herein by reference.

TECHNICAL FIELD

The present invention relates to a cathode active material for a secondary battery, a method of manufacturing the same, and a cathode for a lithium secondary battery including the cathode active material, and more particularly, to a cathode active material uniformly coated with two or more metal composite oxide layers, a method of manufacturing the same, and a cathode for a lithium secondary battery including the cathode active material.

BACKGROUND ART

In line with the increasing use of mobile devices and vehicles, demand for secondary batteries as their energy sources has been rapidly increased. As the secondary batteries, lithium secondary batteries having high energy density, high voltage, long cycle life, and low self-discharging rate have been commercialized and widely used.

A lithium secondary battery may be largely composed of a cathode active material, an anode active material, a separator, and an electrolyte. Specifically, a carbon material has been used as a main component of the anode active material, and in addition, research into using lithium metal, a sulfur compound, a silicon compound, and a tin compound has been actively conducted. Also, a layered structure, lithium-containing cobalt oxide ($LiCoO_2$) has been mainly used as the cathode active material, and in addition, lithium metal compounds having a layered structure (the metal includes manganese, cobalt, nickel, etc.), lithium-containing manganese oxides having a spinel structure ($LiMnO_2$ and $LiMn_2O_4$), and lithium-containing nickel oxide ($LiNiO_2$) have been commercialized.

With respect to $LiCoO_2$ which has currently been most widely used among the above cathode active materials due to excellent life characteristics and charge and discharge efficiency, it has limitations in being applied to high-capacity batteries for electric vehicles due to the fact that it has low structural stability, has high raw material costs, and causes environmental pollution. With respect to a lithium manganese oxide, such as $LiMnO_2$ and $LiMn_2O_4$, studied as an alternative material of $LiCoO_2$, it is inexpensive, but has disadvantages in that electrical conductivity is low, capacity is low, and electrode degradation rapidly occurs at high temperature. Also, with respect to the lithium-containing nickel oxide, it has battery characteristics of high discharge capacity, but has disadvantages in that it is difficult to be synthesized by a simple solid-state reaction and its cycle characteristics are low.

Therefore, there is an urgent need to develop a novel cathode active material having excellent high-temperature stability, lower manufacturing costs, and excellent cycle characteristics.

DISCLOSURE OF THE INVENTION

Technical Problem

An aspect of the present invention provides a cathode active material uniformly coated with two or more metal composite oxide layers.

Another aspect of the present invention provides a method of manufacturing the cathode active material.

Another aspect of the present invention provides a cathode for a lithium secondary battery including the cathode active material.

Another aspect of the present invention provides a secondary battery in which cycle characteristics are improved by including the cathode for a lithium secondary battery.

Technical Solution

According to an aspect of the present invention, there is provided a cathode active material including:
a lithium-containing transition metal oxide; and
two or more metal composite oxide layers selected from the group consisting of Chemical Formulae 1 to 3 which are coated on a surface of the lithium-containing transition metal oxide:

$M(C_2H_5O_2)_n$  [Chemical Formula 1]

$M(C_6H_{(8-n)}O_7)$  [Chemical Formula 2]

$M(C_6H_{(8-n)}O_7)(C_2H_5O_2)$  [Chemical Formula 3]

(where M, as a metal desorbed from a metal precursor, represents at least one metal selected from the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), and cerium (Ce), and n is an integer between 1 and 4).

According to another aspect of the present invention, there is provided a method of manufacturing a cathode active material including the steps of: a first step of preparing a metal glycolate solution by performing two-steps heating process; a second step of mixing lithium-containing transition metal oxide particles and the metal glycolate solution and stirring in a paste state; a third step of drying the paste-state mixture; and a fourth step of performing a heat treatment on the dried mixture.

According to another aspect of the present invention, there is provided a cathode for a secondary battery including a cathode collector and the cathode active material of the present invention coated on the cathode collector, and a lithium secondary battery including the cathode.

Advantageous Effects

According to a method of the present invention, a cathode active material having improved conductivity and density may be manufactured by including two or more metal composite oxide layers that are coated to a uniform thickness. Also, a secondary battery having improved cycle characteristics may be prepared by including the cathode active material.

MODE FOR CARRYING OUT THE INVENTION

Hereinafter, the present invention will be described in detail.

Recently, the need for using a cathode of a lithium ion secondary battery at a high voltage increases, and accordingly, research into methods for preparing a cathode active material having excellent high-temperature stability, low manufacturing costs, excellent capacity, and excellent cycle characteristics has emerged. For example, in order to improve thermal stability and cycle characteristics, a method of coating the surface of a cathode active material with two or more metal oxides using a typical dry or wet coating method has been proposed. However, since it is difficult to coat two or more metal composite oxides to have a uniform thickness by the typical method, the degree of improvement is still insufficient. For example, the dry coating method has advantages in that the process is simple and cost is low, but has disadvantages in that it is difficult to form two or more metal composite oxide coating layers having a uniform thickness on the surface of a cathode active material. The wet coating method may form a metal oxide coating layer having a uniform thickness. However, the wet coating method has disadvantages in that anions capable of degrading battery characteristics may not only remain on the surface of the metal oxide coating layer, but it may also be difficult to coat two or more metal composite oxide layers having a uniform thickness which may further improve charge and discharge efficiency.

Accordingly, the present invention aims at providing a cathode active material coated with two or more metal composite oxides having a uniform thickness, a method of manufacturing the same, and a secondary battery including the cathode active material.

Specifically, according to an embodiment of the present invention, provided is a cathode active material including:
a lithium-containing transition metal oxide; and
two or more metal composite oxide layers selected from the group consisting of Chemical Formulae 1 to 3 which are coated on a surface of the lithium-containing transition metal oxide:

$M(C_2H_5O_2)_n$      [Chemical Formula 1]

$M(C_6H_{(8-n)}O_7)$      [Chemical Formula 2]

$M(C_6H_{(8-n)}O_7)(C_2H_5O_2)$      [Chemical Formula 3]

(where M, as a metal desorbed from a metal precursor, represents at least one metal selected from the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), and cerium (Ce), and n is an integer between 1 and 4).

Also, in the cathode active material of the present invention, the lithium-containing transition metal oxide may include one selected from the group consisting of $LiMO_2$ (M=Co, Mn, Ni, $Ni_{1/3}CO_{1/3}Mn_{1/3}$, Cr, or V), $LiMO_4$ (M=CoMn, NiV, CoV, CoP, FeP, MnP, NiP, or $Mn_2$), $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0<y<1), $Li(Ni_aMn_bCo_c)O_4$ (0<a<2, 0<b<2, 0<c<2, a+b+c=2), $LiMn_{2-z}Ni_zO_4$, $LiMn_{2-z}Co_zO_4$ (0<z<2), and $LiV_3O_6$.

Specifically, typical examples of the lithium-containing transition metal oxide may be $LiCoO_2$, $LiNiO_2$, $LiMnO_2$, $LiCuO_2$, $LiMn_2O_4$, $LiNi_{1/3}Mn_{1/3}Co_{1/3}O_2$, $LiNi_{0.6}Mn_{0.2}Co_{0.2}O_2$, $LiCoPO_4$, or $LiFePO_4$.

Also, in the cathode active material of the present invention, the two or more metal composite oxide layers may be formed in a single layer structure, in which two or more metal composite oxides are uniformly mixed, or a multilayer structure having two or more layers in which each of two or more metal composite oxides is sequentially stacked.

A total thickness of the two or more metal composite oxide layers may be in a range of 5 nm to 500 nm. In the case that the thickness of the two or more metal composite oxide layers is less than 5 nm, an effect of protecting a cathode material may be reduced. In the case in which the thickness of the two or more metal composite oxide layers is greater than 500 nm, since the two or more metal composite oxide layers may obstruct lithium-ion movement, battery capacity and output may be reduced.

Also, an amount of metal in the two or more metal composite oxide layers may be in a range of 0.01 wt % to 10 wt % based on a total weight of the lithium-containing transition metal oxide. In the case that the amount of the metal in the two or more metal composite oxide layers is less than 0.01 wt %, the protective effect due to the coating may be reduced. In the case in which the amount of the metal in the two or more metal composite oxide layers is greater than 10 wt %, since an excessive amount of the metal is coated, the two or more metal composite oxide layers may adversely affect the rate capacity and output of the battery.

Furthermore, the present invention may provide a method of manufacturing a cathode active material including the two or more metal composite oxide layers.

Specifically, the method may include the steps of:
a first step of preparing a metal glycolate solution by performing two-steps heating process;
a second step of mixing lithium-containing transition metal oxide particles and the metal glycolate solution and stirring in a paste state;
a third step of drying the paste-state mixture; and
a fourth step of performing a heat treatment on the dried mixture.

In this case, in the method of the present invention, the first step of preparing a metal glycolate solution by performing two-steps heating process may be performed by a method including preparing a mixed solution by dispersing a metal precursor and a chelating agent in a glycol-based solvent; performing primary heating on the mixed solution; and performing secondary heating on the mixed solution.

During the preparation of the metal glycolate solution (the first step), the glycol-based solvent is a component added to function as a reactant which forms a metal organo-compound by combining (reacting) with a metal desorbed from the metal precursor during a heating process. Typical examples of the glycol-based solvent may include solvents having a boiling point (bp) of 120° C. to 400° C., for example, a single material selected from the group consisting of ethylene glycol (bp 197° C.), propylene glycol (bp 188° C.), diethylene glycol (bp 245° C.), triethylene glycol (bp 285° C.), and polyethylene glycol, or a mixture of two or more thereof, but the present invention is not particularly limited thereto. In the case that a solvent having a boiling point of less than 120° C. is used as the glycol-based solvent, since the binding reaction with the metal desorbed from the metal precursor does not occur, the metal organo-compound may be difficult to be formed.

Also, during the preparation of the metal glycolate solution (the first step), the metal precursor is not particularly limited so long as it includes a typical metal, and for example, the metal precursor may include a single material selected form the group consisting of acetate, hydroxide, nitrate, nitride, sulfate, sulfide, alkoxide, and halide, which include at least one metal selected form the group consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce, or a mixture of two or more thereof. Specifically, typical examples of the metal precursor may be aluminum acetate, zirconium nitride, or manganese acetate.

During the preparation of the metal glycolate solution (the first step), the chelating agent is a component added to facilitate the binding between the glycol-based solvent and the metal by more easily desorbing the metal from the metal precursor, and typical examples of the chelating agent may include a single material selected from the group consisting of citric acid, ethylenediaminetetraacetic acid (EDTA), oxalic acid, and gluconic acid, or a mixture of two or more thereof.

Also, during the preparation of the metal glycolate solution (the first step), a content ratio (parts by weight) of the metal precursor: the glycol-based solvent: the chelating agent may be in a range of 1:1:0.1 to 1:500:20, for example, 1:1:0.1 to 1:100:20.

In the case that the amount of the glycol-based solvent is less than 1 part by weight, the metal desorbed from the metal precursor may not entirely react with the glycol-based solvent to remain in a state of the metal precursor. Also, in the case in which the amount of the glycol-based solvent is greater than 500 parts by weight, since a large amount of the glycol-based solvent not participating in the reaction must be removed by being evaporated during the heating after the reaction, the consumption of energy and the glycol-based solvent may be large and side reactions may occur in a solvent evaporation process. Furthermore, in the case that the amount of the chelating agent is less than 0.1 parts by weight, the effect of the chelating agent may not be sufficiently obtained. In the case in which the amount of the chelating agent is greater than 20 parts by weight, since a large amount of the chelating agent preferentially react with the metal precursor to inhibit the reaction between the glycol-based solvent and the metal precursor, a desired yield of the metal organo-compound may be reduced.

Also, during the preparation of the metal glycolate solution (the first step), an additive may be further included in the mixed solution.

The additive may improve the yield of metal composite oxide by being included as a catalyst component which promotes the reaction between the metal desorbed from the metal precursor and the glycol-based solvent. The additive may be a component which does not remain later in a coating layer by being entirely evaporated and removed during the heating. Typical examples of the additive may include a single material selected from the group consisting of formaldehyde, acetaldehyde, and glycolic acid, or a mixture of two or more thereof.

The additive may be included in an amount of 0.1 parts by weight to 20 parts by weight based on total 1 part by weight of the metal precursor. In the case that the amount of the additive is greater than 20 parts by weight, there may be a possibility that a large amount of byproducts may be formed due to the occurrence of side reactions.

Also, during the preparation of the metal glycolate solution (the first step), the performing of the primary heating may be performed at a temperature below a boiling point of the glycol-based solvent, as a temperature at which the reaction is initiated, to a temperature above the boiling point. Specifically, the performing of the primary heating may be performed in a temperature range of 100° C. to 300° C., for example, 110° C. to 230° C., for 1 hour to 48 hours, for example, 5 hours to 20 hours. The performing of the primary heating may be performed in which a time at which all metal of the metal precursor react with the glycol-based solvent to form the metal organo-compound is set as a termination point.

A viscosity of the mixed solution after the primary heating may be in a range of about 1 cps (centipoise) to about 1,000 cps, and specifically, the mixed solution may have a viscosity similar to the glycol-based solvent.

Furthermore, during the preparation of the metal glycolate solution (the first step), the performing of the secondary heating may be immediately performed with no time interval, such as a cooling process, after the primary heating. In this case, the performing of the secondary heating may be performed at a temperature near the boiling point of the glycol-based solvent or thereabove. Specifically, the performing of the secondary heating may be performed in a temperature range of 100° C. to 300° C., for example, 170° C. to 250° C., for 1 hour to 5 hours. For example, in the case that ethylene glycol is used as the glycol-based solvent, the performing of the secondary heating may be performed at a temperature of about 180° C. or more for 1 hour to 5 hours.

The performing of the secondary heating may be performed until a termination point at which the glycol-based solvent used as a reactant is sufficiently removed to form a metal glycolate solution. Thus, the performing of the secondary heating may be referred to as "heating and concentrating". In this case, the metal glycolate solution may have a viscosity of 1 cps to 15,000 cps, specifically, 200 cps to 5,000 cps, for example, 1,000 cps to 3,000 cps.

During the preparation of the metal glycolate solution (the first step), the performing of the primary heating and the performing of the secondary heating may be performed in an inert gas atmosphere such as argon (Ar).

In the case that the metal glycolate solution is prepared by the method including the performing of the secondary heating, a concentration of the coating solution may be easily adjusted during the preparation of the cathode active material including the metal coating layer, and thus, the effectiveness of coating may be improved by controlling coating conditions according to the concentration of the coating solution.

As described above, in the first step, a glycol-based solvent (e.g., ethylene glycol), a metal precursor, and a chelating agent (e.g., citric acid) are mixed to prepare a mixed solution, and coordination bonds are then formed between oxygen of the glycol-based solvent and the chelating agent and metal ions desorbed from the metal precursor while hydrogen of the glycol-based solvent and the chelating agent is desorbed during heating (concentrating) the mixed solution. As a result, a metal glycolate coating solution including a metal organo-compound as a main component is obtained while a metal desorbed from the metal precursor, the glycol-based solvent, and the chelating agent are combined together.

Typical examples of the metal glycolate solution prepared by the above method may include a single material selected from the group consisting of aluminum glycolate, zirconium glycolate, titanium glycolate, calcium glycolate, and manganese glycolate, or a mixture of two or more thereof.

Also, in the method of manufacturing a cathode active material of the present invention, the mixing of the lithium-containing transition metal oxide particles and the metal glycolate solution and the stirring in a paste state (the second step) may be performed at a revolution speed of 500 rpm to 2,000 rpm and a rotation speed of 500 rpm to 2,000 rpm, specifically, at a revolution speed of 1,500 rpm and a rotation speed of 1,500 rpm using a paste mixer.

Furthermore, the drying of the paste-state mixture (the third step), as a step performed for evaporating a solvent in the paste-state mixture, may be performed in a temperature range of 100° C. to 200° C., specifically, at a temperature of 180° C. for 1 hour to 4 hours, for example, 2 hours.

Subsequently, in the method of manufacturing a cathode active material of the present invention, the performing of the heat treatment (the fourth step) may be performed in a temperature range of about 200° C. to about 1,200° C., specifically, at a temperature of 180° C. for 1 hour to 3 hours, for example, 1 hour in an air (oxidation) atmosphere.

In the case that the heat treatment temperature is greater than 1,200° C., a phenomenon may occur in which oxygen present in the lithium-containing transition metal oxide constituting the cathode active material is desorbed in a gaseous form, and in the case in which the heat treatment temperature is equal to or less than 200° C., a uniform metal oxide coating layer may not be formed.

After the performing of the heat treatment (the fourth step), a metal oxide layer derived from the metal glycolate solution is formed to a uniform thickness on the surface of the lithium-containing transition metal oxide. In this case, two or more metal composite oxide layers may be formed on the surface of the cathode active material according to the type of the metal glycolate solution.

In the method of manufacturing a cathode active material of the present invention, the metal oxide layer coated on the surface of the cathode active material after the performing of the heat treatment (the fourth step) may include an oxide layer of at least one metal selected from the group consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce.

As described above, in the method of the present invention, the metal glycolate solution and cathode active material particles are mixed and then heat-treated. Thus, the surface of the cathode active material, for example, the surface of the lithium-containing transition metal oxide, of the secondary battery may be coated with two or more metal composite oxides having a uniform thickness. Therefore, the effect of anions may not only be minimized, but various metal composite oxides may also be coated. In addition, since a uniform carbon coating layer may be further formed on the surface of the cathode active material without additional supply of a carbon source by controlling an oxidation/reduction heat treatment atmosphere as a subsequent process, a cathode active material having improved thermal stability, capacity characteristics, and cycle characteristics and a secondary battery including the cathode active material may be manufactured.

That is, since the metal oxide layer may act as an electrical resistance layer exhibiting significant internal resistance during high-rate discharge, such as a short circuit during the operation of the secondary battery, to obstruct the introduction of electrons into a lithium-containing transition metal oxide core, the metal oxide layer may also suppress the intercalation of lithium ions. That is, since the metal oxide layer may decrease the rate at which a large amount of lithium ions and electrons released from an anode during internal short circuit are intercalated into the cathode active material, the metal oxide layer may prevent the generation of heat due to the generation of instantaneous overcurrent and may improve the stability of the battery. If only a portion of the surface of the lithium-containing transition metal oxide is coated with the metal oxide, lithium ions and electrons may be intercalated into the lithium-containing transition metal oxide through a portion which is not coated with the metal oxide. Thus, the above-described effect, such as the decrease in the movement speed of lithium ions and electrons, may not be obtained, but an area through which lithium ions and electrons pass may also be decreased to further increase the local movement speed of the lithium ions and electrons due to a nozzle effect. Thus, the metal oxide layer may adversely affect the stability of the battery by promoting the local generation of heat. However, according to the present invention, since the surface of the lithium-containing transition metal oxide is uniformly coated with a metal oxide, the flow of lithium ions may be suppressed by maximizing the action of the metal oxide layer as a resistor when the overcurrent flows. In particular, the cathode active material of the present invention including the lithium-containing transition metal oxide coated with a metal oxide may decrease the surface energy of the lithium-containing transition metal oxide to change into a stable state, and thus, thermal stability may be improved by suppressing side reactions between the lithium-containing transition metal oxide and an electrolyte solution.

Also, the present invention provides a cathode for a secondary battery including a cathode collector and the cathode active material of the present invention coated on the cathode collector.

In this case, the cathode collector is generally fabricated to have a thickness of about 3 µm to about 500 µm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like.

Also, the cathode active material may further include a binder and a conductive agent in addition to the cathode active material coated with a metal oxide layer of the present invention.

The binder is a component that assists in the binding between the active material and the conductive agent and in the binding with the collector. The binder is commonly added in an amount of 1 wt % to 30 wt % based on a total weight of a mixture including the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene butadiene rubber, a fluoro rubber, various copolymers, and the like.

Also, the conductive agent is commonly added in an amount of 1 wt % to 30 wt % based on the total weight of the mixture including the cathode active material. Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

Also, according to an embodiment of the present invention, a lithium secondary battery composed of the cathode including the cathode active material, an anode, a separator, and a lithium salt-containing non-aqueous electrolyte solution is provided.

The anode, for example, is prepared by coating an anode collector with an anode material including an anode active material and then drying the anode collector. If necessary, components, such as the conductive agent, the binder, and a filler, may be included in the anode material.

The anode collector is generally fabricated to have a thickness of about 3 µm to about 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, a foil, a net, a porous body, a foam body, a non-woven fabric body, and the like.

The separator is disposed between the cathode and the anode, and a thin insulating film having high ion permeability and mechanical strength is used. The separator typically has a pore diameter of 0.01 µm to 10 µm and a thickness of 5 µm to 300 µm.

For example, sheets or non-woven fabrics formed of an olefin-based polymer such as polypropylene; glass fibers or polyethylene, which have chemical resistance and hydrophobicity, are used as the separator. When a solid electrolyte, such as a polymer, is used as an electrolyte, the solid electrolyte may also serve as the separator.

The lithium salt-containing non-aqueous electrolyte solution is formed of an electrolyte and a lithium salt, and a non-aqueous organic solvent or an organic solid electrolyte may be used as the electrolyte solution.

Examples of the non-aqueous organic solvent may include aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

The lithium salt is a material that is readily soluble in the non-aqueous electrolyte and for example, may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$ chloroborane lithium, lower aliphatic carboxylic acid lithium, lithium tetraphenyl borate and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the electrolyte solution. In some cases, halogen-containing solvents, such as carbon tetrachloride and ethylene trifluoride, may be further included in order to impart incombustibility, and carbon dioxide gas may be further included in order to improve high-temperature storage characteristics.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Preparation Example 1. Preparation of Metal Glycolate Solution 40 g of zirconium nitride (ZrN) and 10 g of citric acid ($C_6H_8O_7$) were stirred in 200 g of an ethylene glycol ($C_2H_6O_2$) solution to prepare a mixed solution. The mixed solution was primarily heated at a temperature of 150° C. for 5 hours, and then secondarily heated at a temperature of 180° C. for 1 hour to prepare a zirconium glycolate solution.

Preparation Example 2. Preparation of Metal Glycolate Solution 30 g of titanium isopropoxide ($Ti(OCH(CH_3)_2)_4$) and 10 g of citric acid ($C_6H_8O_7$) were stirred in 200 g of an ethylene glycol ($C_2H_6O_2$) solution to prepare a mixed solution. The mixed solution was primarily heated at a temperature of 150° C. for 5 hours, and then secondarily heated at a temperature of 180° C. for 1 hour to prepare a titanium glycolate solution.

Preparation Example 3. Preparation of Metal Glycolate Solution 20 g of calcium acetate ($Ca(C_2H_3O_2)_2$) and 10 g of citric acid ($C_6H_8O_7$) were stirred in 200 g of an ethylene glycol ($C_2H_6O_2$) solution to prepare a mixed solution. The mixed solution was primarily heated at a temperature of 140° C. for 5 hours, and then secondarily heated at a temperature of 180° C. for 1 hour to prepare a calcium glycolate solution.

Preparation Example 4. Preparation of Metal Glycolate Solution 40 g of aluminum acetate ($Al(C_2H_3O_2)_3$) and 20 g of citric acid ($C_6H_8O_7$) were stirred in 200 g of an ethylene glycol ($C_2H_6O_2$) solution to prepare a mixed solution. The mixed solution was primarily heated at a temperature of 140° C. for 5 hours, and then secondarily heated at a temperature of 180° C. for 1 hour to prepare an aluminum glycolate solution.

Example 1. Preparation of Cathode Active Material

While adding 1 g of the zirconium glycolate solution of Preparation Example 1 and 1 g of the aluminum glycolate solution of Preparation Example 4 to 8 g of ethanol and stirring, $LiNi_{0.6}Mn_{0.2}Co_{0.2}O_2$ was added thereto and stirred in a paste state. The stirred paste was dried at 180° C. for 2 hours and then heat-treated at 800° C. in air for 1 hour to manufacture cathode active material particles coated with a metal composite oxide layer formed of zirconium oxide and aluminum oxide.

The results of field-emission scanning electron microscope (FE-SEM) and energy dispersive spectrometer (EDS) analysis of the surface of the manufactured cathode active material are presented in Table 1 below (see FIG. 1).

TABLE 1

| Element | Wt % |
|---------|------|
| Al | 1.06 |
| Zr | 1.05 |
| Ni | 27.87 |
| Mn | 8.68 |
| Co | 9.16 |
| O | 52.19 |
| Total | 100 |

Figure 1:
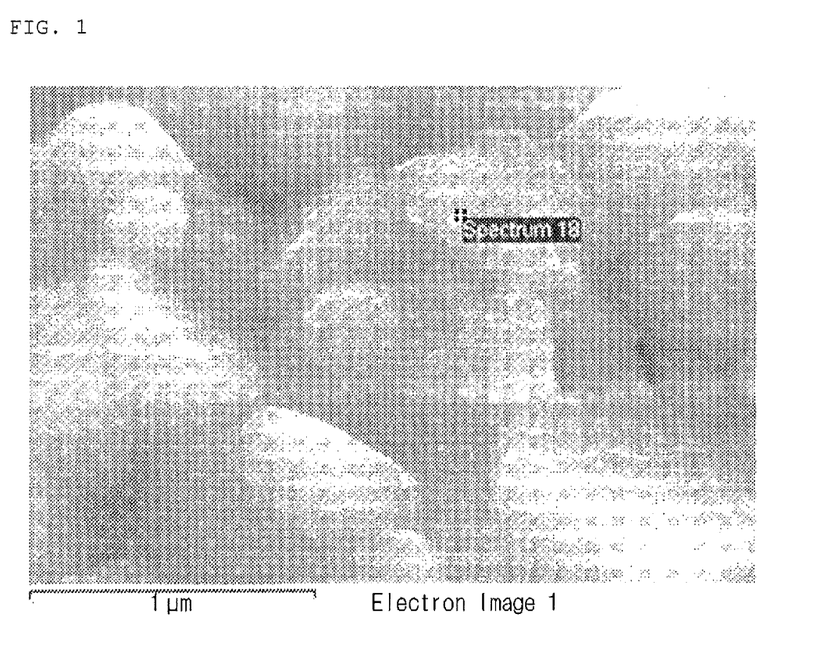
FIG. 1 is a field-emission scanning electron microscope (FE-SEM) image of a cathode active material according to Example 1 of the present invention.

Referring to FIG. 1, amounts of elements in a portion marked as "spectrum 18" in an FE-SEM image were analyzed by EDS. As a result, it may be understood that cathode materials of Ni, Mn, and Co were present in the form of an oxide and the amounts of Al and Zr, as a composite coating material, were analyzed to be 1.06 wt % and 1.05 wt %, respectively. Furthermore, it may be confirmed that the surface of the cathode active material was very clean in the FE-SEM image, and thus, it may be understood that the composite coating of Al and Zr was very uniform.

Example 2. Preparation of Cathode Active Material

While adding 1 g of the titanium glycolate solution of Preparation Example 2 and 1 g of the calcium glycolate solution of Preparation Example 3 to 8 g of ethanol and stirring, $LiNi_{0.6}Mn_{0.2}Co_{0.2}O_2$ was added thereto and stirred in a paste state. The stirred paste was dried at 180° C. for 2 hours and then heat-treated at 800° C. in air for 1 hour to manufacture cathode active material particles coated with a metal composite oxide layer formed of calcium oxide and titanium oxide.

The results of FE-SEM and EDS analysis of the surface of the manufactured cathode active material are presented in Table 2 below (see FIG. 2).

TABLE 2

| Element | Wt % |
|---------|------|
| Ti | 1.39 |
| Ca | 1.29 |
| Ni | 28.78 |
| Mn | 9.91 |
| Co | 9.29 |
| O | 49.35 |
| Total | 100 |

Figure 2:
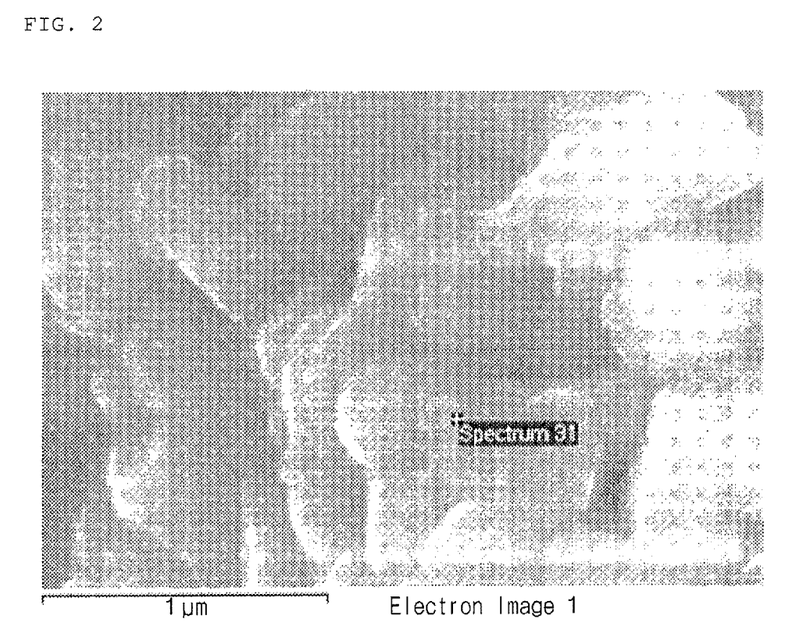
FIG. 2 is an FE-SEM image of a cathode active material according to Example 2 of the present invention.

Referring to FIG. 2, amounts of elements in a portion marked as "spectrum 31" in an FE-SEM image were analyzed by EDS. As a result, it may be understood that cathode materials of Ni, Mn, and Co were present in the form of an oxide and the amounts of Ti and Ca, as a composite coating material, were analyzed to be 1.39 wt % and 1.29 wt %, respectively. Furthermore, it may be confirmed that the surface of the cathode active material was very clean in the FE-SEM image, and thus, it may be understood that the composite coating of Ti and Ca was very uniform.

Example 3. Preparation of Cathode and Secondary Battery

A slurry was prepared by adding 90 wt % of the cathode active material particles of Example 2, 6 wt % of carbon black as a conductive agent, and 4 wt % of polyvinylidene fluoride (PVDF) as a binder to N-methyl-pyrrolidone (NMP). An aluminum (Al) foil as a cathode collector was coated with the slurry, and the coated Al foil was then rolled and dried to prepare a cathode for a lithium secondary battery.

Subsequently, a porous polyethylene separator was disposed between the cathode and a graphite-based anode, and a lithium salt-containing electrolyte solution was injected to prepare a secondary battery cell.

Comparative Example 1

A slurry was prepared by adding 90 wt % of $LiNi_{0.6}Mn_{0.2}Co_{0.2}O_2$ as a cathode active material, 6 wt % of carbon black as a conductive agent, and 4 wt % of PVDF as a binder to NMP. An Al foil as a cathode collector was coated with the slurry, and the coated Al foil was then rolled and dried to prepare a cathode for a lithium secondary battery in which a metal coating layer was not formed.

Subsequently, a porous polyethylene separator was disposed between the cathode and a graphite-based anode, and a lithium salt-containing electrolyte solution was injected to prepare a secondary battery cell.

Experimental Example 1. Comparison of Cycle Life Characteristics

Figure 3:
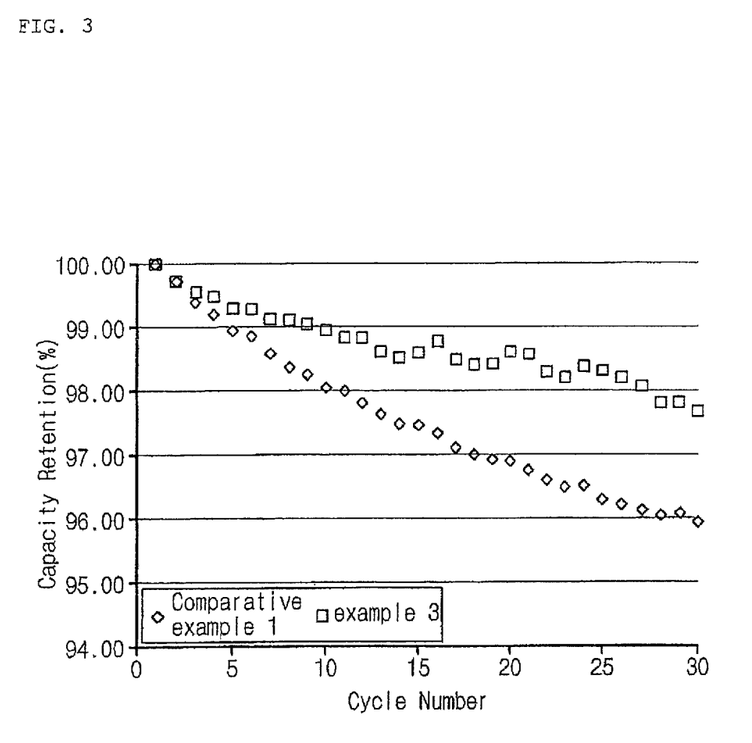
FIG. 3 is a graph comparing cycle characteristics of secondary batteries according to Experimental Example 1 of the present invention.

Cycle life characteristics of the secondary battery cell of Example 3 and the secondary battery cell of Comparative Example 1 were measured. Referring to FIG. 3, it may be confirmed that the cycle life characteristics of the lithium secondary battery of Example 3 including a metal composite oxide layer was improved in comparison to that of the secondary battery of Comparative Example 1 which does not include a metal coating layer.

The invention claimed is:

1. A cathode active material comprising:
   a lithium-containing transition metal oxide; and
   two or more metal composite oxide layers selected from the group consisting of Chemical Formulae 1 to 3 which are coated on a surface of the lithium-containing transition metal oxide:

$M(C_2H_5O_2)_n$             [Chemical Formula 1]

$M(C_6H_{(8-n)}O_7)$            [Chemical Formula 2]

$M(C_6H_{(8-n)}O_7)(C_2H_5H_2)$        [Chemical Formula 3]

(where M, as a metal desorbed from a metal precursor, represents at least one metal selected from the group consisting of magnesium (Mg), calcium (Ca), strontium (Sr), barium (Ba), yttrium (Y), titanium (Ti), zirconium (Zr), vanadium (V), niobium (Nb), tantalum (Ta), chromium (Cr), molybdenum (Mo), tungsten (W), manganese (Mn), iron (Fe), cobalt (Co), iridium (Ir), nickel (Ni), zinc (Zn), aluminum (Al), gallium (Ga), indium (In), silicon (Si), germanium (Ge), tin (Sn), lanthanum (La), and cerium (Ce), and n is an integer between 1 and 4).

2. The cathode active material of claim 1, wherein the lithium-containing transition metal oxide comprises one selected from the group consisting of $LiMO_2$ (M=Co, Mn, Ni, $Ni_{1/3}Co_{1/3}Mn_{1/3}$, Cr, or V), $LiMO_4$ (M=CoMn, NiV, CoV, CoP, FeP, MnP, NiP, or $Mn_2$), $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0<y<1), $Li(Ni_aMn_bCo_c)O_4$ (0<a<2, 0<b<2, 0<c<2, a+b+c=2), $LiMn_{2-z}Ni_zO_4$, $LiMn_{2-z}Co_zO_4$ (0<z<2), and $LiV_3O_6$.

3. The cathode active material of claim 1, wherein the lithium-containing transition metal oxide is $LiCoO_2$, $LiNiO_2$, $LiMnO_2$, $LiCuO_2$, $LiMn_2O_4$, $LiNi_{1/3}Mn_{1/3}Co_{1/3}O_2$, $LiNi_{0.6}Mn_{0.2}Co_{0.2}O_2$, $LiCoPO_4$, or $LiFePO_4$.

4. The cathode active material of claim 1, wherein the two or more metal composite oxide layers are formed in a single layer structure, in which two or more metal composite oxides are uniformly mixed, or a multilayer structure having two or more layers in which two or more metal composite oxide layers are sequentially stacked.

5. The cathode active material of claim 1, wherein a total thickness of the two or more metal composite oxide layers is in a range of 5 nm to 500 nm.

6. The cathode active material of claim 1, wherein an amount of metal in the two or more metal composite oxide layers is in a range of 0.01 wt % to 10 wt % based on a total weight of the lithium-containing transition metal oxide.

7. The cathode active material of claim 1, wherein the two or more metal composite oxide layers comprise a composite oxide of at least one metal selected from the group consisting of Mg, Ca, Sr, Ba, Y, Ti, Zr, V, Nb, Ta, Cr, Mo, W, Mn, Fe, Co, Ir, Ni, Zn, Al, Ga, In, Si, Ge, Sn, La, and Ce.

* * * * *